United States Patent [19]
Doll et al.

[11] Patent Number: 4,948,348
[45] Date of Patent: Aug. 14, 1990

[54] IMMERSION PUMP, ESPECIALLY FOR LOW-BOILING FLUIDS

[76] Inventors: Robert Doll, St. Benediktstr. 1, 8044 UnterschleiBheim; Werner Wiedemann, Walter-Meibner-Str. 8, 8046 Garching 40; Hartmut Berndt, Konigsteinstr. 11, 8000 Munchen 40, all of Fed. Rep. of Germany

[21] Appl. No.: 190,029

[22] Filed: May 4, 1988

[30] Foreign Application Priority Data

May 7, 1987 [DE] Fed. Rep. of Germany ....... 3715216

[51] Int. Cl.⁵ ............................................. F04B 17/02
[52] U.S. Cl. ................................. 417/365; 417/423.3; 417/423.12; 417/901
[58] Field of Search ............. 417/423.3, 423.7, 423.11, 417/423.12, 423.14, 424.1, 365, 901; 310/90.5; 415/104, 105, 106, 107, 131, 212 R

[56] References Cited

U.S. PATENT DOCUMENTS

| | | | |
|---|---|---|---|
| 3,316,849 | 5/1967 | Cooper et al. | 417/901 X |
| 3,975,117 | 8/1976 | Carter | 417/423.12 X |
| 4,060,250 | 11/1977 | Davis et al. | 415/172 R X |
| 4,523,896 | 6/1985 | Lhenry et al. | 417/423.12 X |
| 4,620,752 | 11/1986 | Fremerey et al. | 310/90.5 |

FOREIGN PATENT DOCUMENTS 2336488 2/1975 Fed. Rep. of Germany.
2137850 10/1976 Fed. Rep. of Germany.

Primary Examiner—Leonard E. Smith
Assistant Examiner—Eugene L. Szczecina, Jr.
Attorney, Agent, or Firm—Silverman, Cass & Singer, Ltd.

[57] ABSTRACT

An immersion pump, especially for low-boiling fluids, having a support for a shaft and a ferromagnetic impeller wheel mounted to the shaft. The support includes at least one controllable electromagnet that operates to axially support and position the impeller wheel. An outlet path is also provided to enable vapor bubbles within the moving fluid to escape from the pump and be returned to the liquid supply.

10 Claims, 2 Drawing Sheets

IMMERSION PUMP, ESPECIALLY FOR LOW-BOILING FLUIDS

BACKGROUND OF THE INVENTION

The invention relates generally to immersion pumps, and more particularly to an immersion pump for fluids having low-boiling points in which the rotational support and over-all construction of the immersion pump is virtually maintenance free.

Fluids having low-boiling points are generally in equilibrium with their vapors, especially when stored in a vessel or supply tank. For economically decanting low-boiling fluids, such as, for example, liquid helium or liquid hydrogen, from a larger supply tank into a smaller transport vessel, it is necessarY to return the cold gas, which is displaced from the transport vessel by the transferred liquid, back into the supply tank. If this is accomplished a considerable amount of losses in the form of cold gas can be saved. For the application of such a transfer procedure a pump is necessary which moves the fluid into the transport vessel with increased pressure through a first transfer line, while allowing vapor to escape from the transport vessel and to flow back into the supply tank through a second transfer line.

Additionally, since a low-boiling fluid in a supply tank is in equilibrium with its vapor, a pump for transporting such a fluid can not be positioned above the liquid, thereby creating a suction height, since vapor can enter the pump and the fluid flow. The transport pump must at least dip into the fluid and is preferably inserted into the tank and the liquid as deeply as possible.

In general, no large openings exist in storage tanks that would allow the insertion and installation of a pump for low-boiling fluids. Therefore, such pumps are typically mounted within the sealed storage tank and must be small in size while still providing high feed performance. Furthermore, because of the relatively complicated installation of the pump within the supply tank, it is desirable to provide a pump capable of long-term operation that is as unrestricted and as free from maintenance as possible.

In addition, the heat losses generated by such pumps must be kept as low as possible. Since the evaporation temperatures of the low-boiling fluids, especially of helium, are low, any heat produced by the pump leads to a considerable formation of vapor that in turn relates to a loss of fluid. Also, the appearance of vapor bubbles in the conveying fluid current reduces the pressure produced by the pump and must therefore be avoided. Accordingly, as close to a single-phase fluid current as possible should be maintained. This makes it necessary to provide a particular type of sealing Of the inlet and the outlet of the pump impeller wheel and a particular type of vapor control system.

A rotary pump for liquid helium was disclosed in July 1975, in a final report of the U.S. Department of Commerce, "Performance Characteristics of a Liquid Helium Pump". That report relates to an impeller wheel which is open on one side, is positioned in a suspended manner, and sits on a common shaft with the rotor of an induction motor. The shaft is supported with ball bearings, which, like the entire rotor, operate in liquid helium. These ball bearings, however, are not usable at low temperatures, especially at the temperatures of liquid helium or liquid hydrogen, unless they are specially constructed with bearing cages having special self-lubricating materials. The performance of these types of ball bearing structures in such low-boiling fluids, however, is not at all comparable with the performance which can be attained by these ball bearing structures at room temperature. This is due to the fact that friction losses inherent in these ball bearing structures at low temperatures are considerably higher than when they are operated with normal lubrication at room temperature. Thus, the requirements for unrestricted, maintenance-free, long-term operation, including reduced friction, can not be fulfilled by means of these known liquid helium rotary pumps.

It is also known to provide a magnetic support for a rapidly-operating shaft of a turbine rotor as described in German Patent No. DE-PS 21 37 850. In this arrangement, special structure is provided for the radial centering and axial positioning of the rotor. The centering takes place by utilizing ring-shaped cutting pole shoes which are positioned on the ends of the rotor shafts and are used in conjunction with permanent magnet systems. The axial support of the shaft takes place by utilizing active, controlled, magnet systems which engage separate, disk-shaped pole shoes positioned on the shaft. The signals necessary for the control of the axial magnets are obtained through an optical scanning of the shaft position. The signals, once electronically processed, are conveyed to the axial magnet systems. The magnet systems provide an axial restoration force with damping to the shaft, which overcomes the negative axial restoration forces of the centering systems. The optical scanning takes place at a single point on the ring-shaped cutting pole shoes of one of the ends of the shaft. Since such an optical scanning can produce signals, even during lateral movements of the shaft, it is also suitable for combatting parasitic forms of movements of the rotor, such as precession, nutation, and rolling movements. In this situation, the pole shoes of the axial magnet system standing opposite the disk-shaped pole shoes on the shafts obtain a slight inclination position and become skewed. Such magnetic supports are not suitable for use in an immersion pump since they are positioned close to the point of the optical scanning. Therefore, if immersed in a fluid, disturbances from the formation of bubbles and possibly through occasional deposition of contaminants as well can not be avoided and can affect the positioning of the shaft.

SUMMARY OF THE INVENTION

The above and other disadvantages of the prior art rotary pumps are overcome in accordance with the present invention by providing an immersion pump, especially for low-boiling fluids, where the rotational support and overall construction of the immersion pump is virtually maintenance-free and provides disruption-free, long-term operation. Moreover, the immersion pump of the present invention has a high degree of efficiency, provides a single-phase fluid flow, and has a small, compact design.

The invention provides maintenance free, long-term operation of a rotary pump through the use of a magnetically supported impeller wheel. Since the impeller wheel is itself positioned within the magnetic support, its construction is simplified. Furthermore, effective sealing of the impeller wheel inlets and outlets relative to the inlet and the outlet of the pump is provided. The sealing is achieved because the impeller wheel has level surfaces on its upper and lower sides formed by plates that directly serve as pole surfaces for the axial magnetic support system. Narrow apertures are established and maintained between the pole surfaces of the axial magnetic support system and the impeller wheel plates to provide the desired sealing of the impeller wheel inlets and outlets. Since the attainable axial support precision of the rotor shaft and impeller wheel is very high with this controlled axial magnet system, very narrow choke apertures between the impeller wheel inlets and outlets and the pump inlet and outlet can be achieved. Choke apertures of a few 0.01 mm to 0.1 mm, for example, can be maintained without difficulty. The requirements for obtaining and maintaining operating precision or tolerances in the radial direction then can be relatively low.

DESCRIPTION OF THE PREFERRED EMBODIMENT

Figure 2:
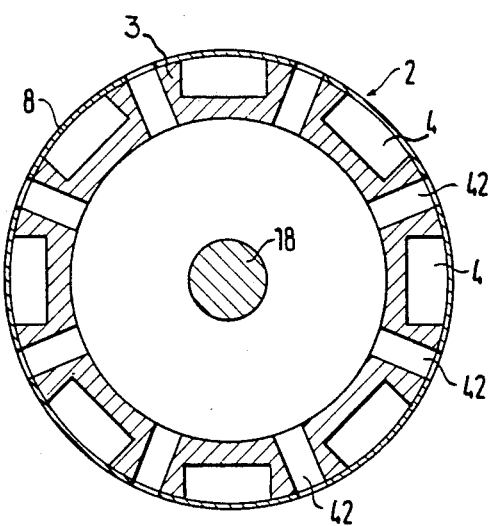
FIG. 2 is a section taken along the line A–B of FIG. 1.

Referring to the drawings, an immersion pump is designated generally by reference numeral 1. The immersion pump 1 has a casing 2 which, for example, is made of metal and preferably is cylindrical in shape. The pump 1 also has an internal casing wall 3 having open axial grooves 4 distributed externally around its circumference as illustrated in FIG. 2. The axial grooves 4 discharge upwardly into a casing space 5. The casing space 5 continues upwardly into an outlet 6 to which a pumping line or conduit (not shown) can be connected by threaded connection supports 7.

In the area of the axial grooves 4, the casing 2 is formed by a covering tube 8. This closes the axial grooves 4 externally so that the grooves 4 form the desired axial channels.

An end portion 9 is attached to the lower end of the casing 2. The end portion 9 has several inlet channels 10 which are outwardly flared. The inlet channels 10 proceed in a curved manner through the end portion 9 from a ring-shaped, lateral inlet opening 11 upwardly in the direction of arrow C to an outlet opening 12 at the top of the end portion 9.

The end portion 9 also accommodates a copper liner or bearing bushing 13. A similar copper liner 14 is attached to the upper end of the casing wall 3. Each copper liner 13 and 14 supports a ring-shaped permanent magnet 15. Ends 16 and 17 of a rotor shaft 18 project into the copper liners 13 and 14. A considerable clearance exists between the ends 16 and 17 and an internal wall 19 of the copper liners or bearing bushings 13 and 14. Each shaft end 16 and 17 also has a permanent magnetic cylinder 20. The direction of magnetization of the ring-shaped permanent magnets 15 and the permanent magnetic cylinders 20 is directed axially and uniformly.

The slight rigidity of this type of radial centering can, when exceeding critical rotational speeds, lead to considerable lateral movements of the rotor shaft 18. Therefore, in the radial direction, a greater aperture or clearance, preferably 0.5 mm, is provided everywhere along the rotor shaft 18.

To provide damping and correction of such lateral movements of the rotor shaft 18, as well as to provide damping of precession, nutation and rolling movements, solid copper parts 21 are attached in the field area of the permanent magnets 15 and the permanent magnetic cylinders 20. During lateral movements of the shaft ends 16 and 17 of the rotor shaft 18, the magnetic flux generated by the magnets 15 and the magnetic cylinders 20 which penetrates the copper parts 21 as well as the copper liners 13 and 14, changes temporarily. This leads to eddy currents in the copper parts 21 and the copper liners 13 and 14 and provides the desired damping of the lateral movements of the rotor shaft 18.

Due to the rotational symmetry of the field geometry, the pure rotational movement is thoroughly free of losses. The damping of parasitic forms of movement of the rotor shaft 18 is particularly well assured at lower temperatures since the conductivity of the copper parts 21 and the copper liners 13 and 14 at lower temperatures is considerably higher than at room temperature and the eddy currents thus increase sharply. The damping at room temperature is also sufficient for rotational speeds of up to 15,000 RPM.

The rotor shaft 18 includes an impeller wheel 22, a laterally magnetized permanent magnet 23 for a drive motor 24, and a ferrite core 25 for an inductive scanning device 26. The impeller wheel 22 has level plate surfaces 27 and 28 on its circumferential areas on its upper and lower sides respectively. Ring-shaped electromagnets 29 and 30 are positioned above and below the impeller wheel 22 and work in conjunction with the level surfaces 27 and 28. The ring-shaped electromagnets 29 and 30 have coils 31 and 32 that cause the magnetic attractive forces. The magnetic attractive forces act through level pole surfaces 33 and 34 of the ring-shaped electromagnets 29 and 30 and are exerted on the flat upper and lower surfaces 27 and 28 of the impeller wheel 22 lying opposite the pole surfaces 33 and 34 at a slight distance. The ring-shaped electromagnets 29 and 30 form the casing wall 3 with their external sides and are secured to the bottom of the casing wall 3.

The impeller wheel 22 is made of a ferromagnetic material. During rotation of the impeller wheel 22 which is otherwise of normal construction, the fluid to be moved through the inlet channels 10 enters axially into the bottom of the impeller wheel 22, and exits radially therefrom.

The impeller wheel 22 is surrounded by a stationary guide wheel or sleeve 35. The guide wheel 35 is inserted within the covering tube 8. As FIG. 2 illustrates, the casing wall 3, at certain points, is free of the axial grooves 4. Flow channels 36 are formed through the guide wheel 35, are positioned proximate the radial outlets of the impeller wheel 22, and are curved upwardly. The flow channels 36 guide the fluid to be moved upwardly in the direction of arrow D of FIG. 1 from the radial outlets of the impeller wheel 22 through the axial grooves 4 of the casing wall 3.

A coil 37 is coordinated with the permanent magnet 23 of the drive motor 24. It is surrounded by a ferrite ring 38 in order to prevent eddy current losses in the casing wall 3. The coil 37 itself preferably is solidly cast and is attached in a sealed manner within the casing wall 3.

The ferrite core 25 of the inductive scanning device 26 that is attached to the rotor shaft 18 is surrounded by a ring-shaped core 39, likewise consisting of ferrite, that contains two coils or spools 40 and 41. The spools 40 and 41 are part of a bridge circuit (not shown) which is operated with a carrier frequency of 30 kHz. If the ferrite core 25 lies symmetrically between the spools 40 and 41, the bridge circuit is equalized and does not generate a signal. In the event of divergences of the ferrite core 25 from the central position, a signal is generated by the bridge circuit which is subsequently rectified in a phase-sensitive manner, amplified, and, once provided with a differential portion, is conducted to the coils 31 and 32 of the ring-shaped electromagnets 29 and 30 in a suitable manner to correct the divergence.

The tolerances attainable from this precise positioning of the impeller wheel 22 falls into the range of manufacturing tolerances for the impeller wheel 22 itself, namely, a few microns, so that positioning of the impeller wheel 22 to within a few hundredths of a millimeter can be achieved. This ability to precisely position the impeller wheel 22 enables the sealing of the fluid path between the inlet and outlet of the pump and impeller wheel 22. Moreover, the ring-shaped electromagnets 29 and 30 form, together with the guide wheel 35, a compact unit with relatively small components so that problems of thermal expansion or contraction when traversing large temperature ranges are avoided.

The field geometry of the impeller wheel 22 is rotationally symmetrical. Therefore, no significant eddy current losses arise during its rotation. By providing the sealing apertures with the same radius as the upper and lower sides 27 and 28 of the impeller wheel 22, they ensure that an axial thrust on the impeller wheel 22 during movement against pressure is thoroughly equalized.

Clearly, since the magnetic support system described above operates completely free of any physically contacting parts, the immersion pump 1 is particularly suited for unrestricted, maintenance-free, long-term operation.

Figure 1:
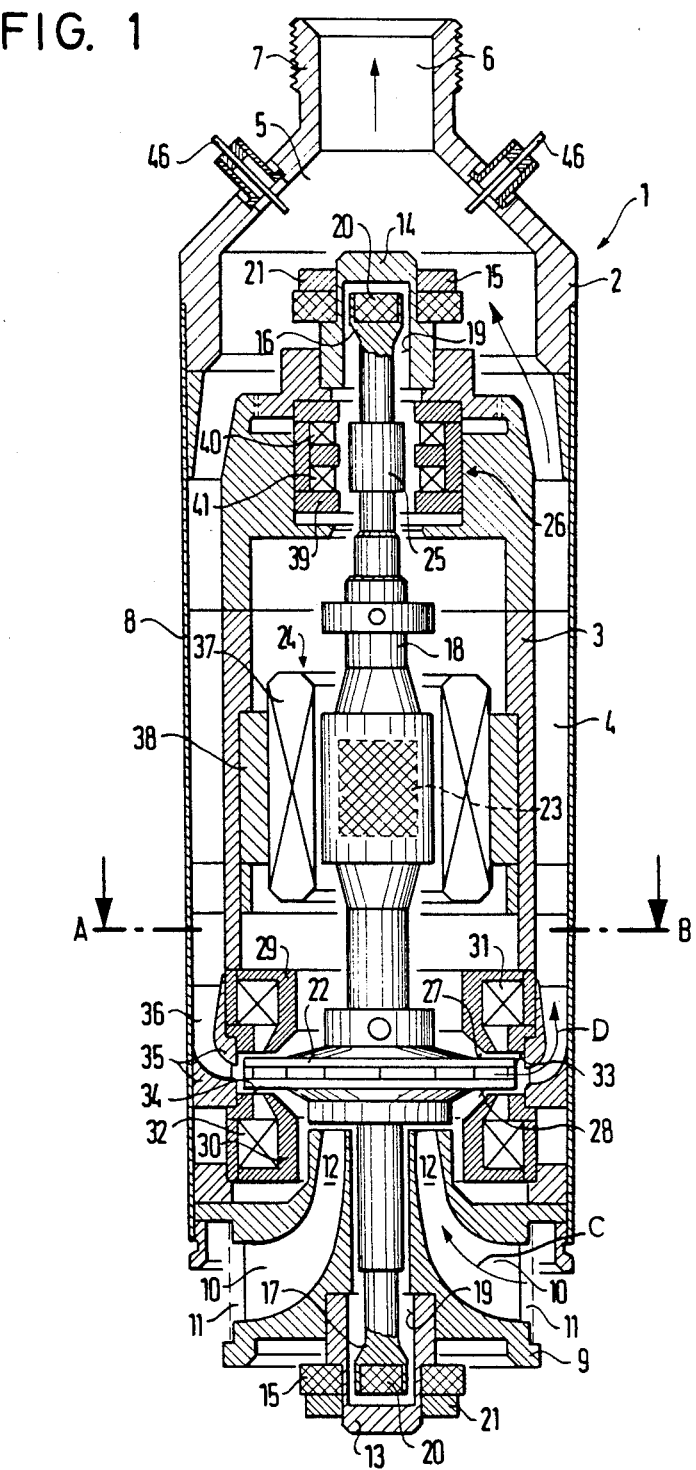
FIG. 1 is a schematic vertical section through the immersion pump in accordance with the invention.
Figure 3:
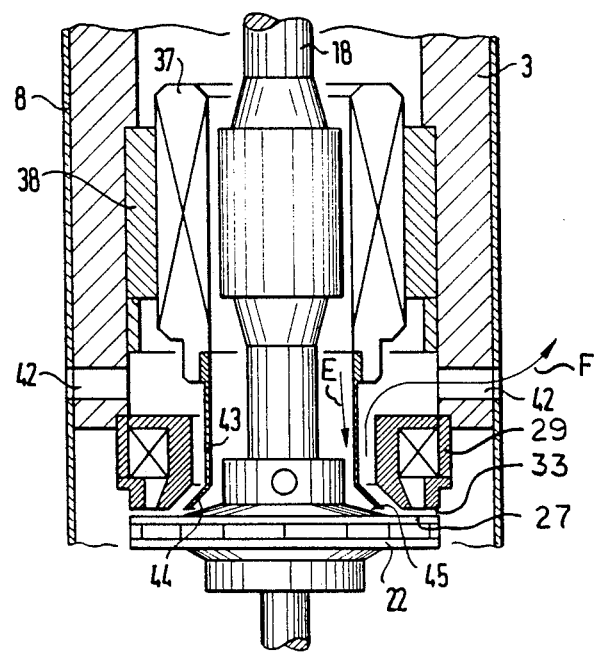
FIG. 3 is an enlarged vertical partial section through the immersion pump.

As mentioned earlier, low-boiling point fluids are generally in equilibrium with their vapors. Accordingly, vapor bubbles can arise within the fluid at every point where friction arises due to rapidly moving parts. Such vapor bubbles in the fluid reduces the pressure produced by the impeller wheel 22 as well as the quantity of fluid conveyed. Vapor bubbles should thus, to the greatest extent possible, not reach the conveying fluid current and, if present in the fluid, should be allowed to escape before the fluid current enters the impeller wheel 22. This can be achieved by using a closed impeller wheel 22 as depicted in FIG. 1 and by positioning apertures or holes 42 as illustrated in FIGS. 2 and 3 within the immersion pump 1 that permit vapor produced by the rotor shaft 18 and/or the impeller wheel 22 to exit the immersion pump 1 and flow back into the storage tank. The holes 42 penetrate the casing wall 3 as well as the cover tube 8 and are positioned around the periphery of the casing wall 3. The holes 42 are illustrated positioned above the impeller wheel 22, but can also be positioned in the area below the impeller wheel 22.

As illustrated in FIG. 3, the holes 42 are in communication with the fluid flow through the slight gap between the pole surfaces 33 and 34 of the ring-shaped electromagnets 29 and 30. The holes 42 thereby remove vapor bubbles which can arise in the space below the top surface 27 of the impeller wheel! 22 Inwardly penetrating leakage portions of fluid can also flow back into the fluid supply through the holes 42.

As illustrated in FIG. 1, the casing wall 3 is sealed at its upper end in a tight manner by the scanning device 26 and the copper liner 14. Once the immersion pump 1 begins operation, the fluid, which initially entirely fills the immersion pump 1 including the interior of the casing wall 3, is gradually evaporated by the heat generated by the friction of the rotor 18. The vapor which arises pushes the fluid downward and out of the internal space around the inductive scanning device 26 and the drive motor 24 within the casing wall 3 so that the rotor shaft 18 eventually only rotates in a medium that is substantially vapor. This leads to a reduction of fiction losses and prevents any interference of the operation of the induction scanning device by fluid particles or bubbles. In order to enhance this vapor medium, a collar or tubing piece 43 as illustrated in FIG. 3 has a flared end forming a funnel 44 which is attached to the lower end of the motor coil 37. The funnel 44 has a distal edge 45 and extends downward and outward until the edge 45 lies in close proximity to the upper side 27 of the impeller wheel 22. With the tubing piece 43, fluid is kept away from the rotor shaft 18, the inductive scanning device 26, and the drive motor 24 and is maintained near the impeller wheel 22. The path of vapor and/or leaking fluid current is indicated by the arrows E and F in FIG. 3.

Near the top of the casing 2, connections 46 for the leads of the scanning device 26 of the motor coil 37 and the ring-shaped electromagnets 29 and 30 are provided. The electrical connections in the internal space have been omitted.

The immersion pump 1 illustrated in the drawings has a feed performance of approximately 500 liters/hour to 2000 liters/hour, an external diameter of 50 mm and an impeller wheel 22 diameter of 36 mm with typical rotational speeds of 6000 to 8000 RPM. The construction size is thus relatively small.

Modifications and variations of the present invention are possible in light of the above teachings. A specific dimension or construction is not required so long as the assembled device is able to function as herein described. It is therefore to be understood that within the scope of the appended claims, the invention may be practiced otherwise than as specifically described.

What is claimed and desired to be secured by letters patent of the United States is:

1. An immersion pump having a support for a shaft and an impeller wheel mounted to the shaft comprising, at least one controllable electromagnet in direct electromagnetic contact with the impeller wheel that acts in an axially supporting manner to directly axially position said impeller wheel, said pump including at least one radial hole through the pump's exterior which connects sealed areas above the impeller wheel with the outside of the pump.

2. The immersion pump as defined in claim 1, wherein said at least one radial hole connects sealed areas above and below the impeller wheel with the outside of the pump.

3. The immersion pump as defined in claim 1 including an electrical motor means for driving the pump shaft, said motor means having a funnel member extending therefrom, the distal end of which extends to a position proximate the impeller wheel.

4. An immersion pump comprising:
an external casing member;
a rotor shaft supported within said external casing member;

motor means for driving said rotor shaft within said external casing member;

an impeller wheel having at least one axial inlet and at least one radial outlet and flat upper and lower surfaces, said impeller wheel being axially mounted to said rotor shaft within said external casing member and being made of a ferromagnetic material;

first and second ring-shaped controllable electromagnets mounted within said external casing member and surrounding said rotor shaft, each of said ring-shaped controllable electromagnets having a pole surface thereon, said first ring-shaped controllable electromagnet being positioned on the upper side of said impeller wheel and said second ring-shaped controllable electromagnet being positioned on the lower side of said impeller wheel, said pole surfaces of said first and second ring-shaped controllable electromagnets being positioned proximate said flat upper and lower surfaces of said impeller wheel respectively near the outer circumference of said impeller wheel to axially support and position said impeller wheel;

an inductive scanning means for monitoring the position of said rotor shaft and for controlling current supplied to said first and second ring-shaped controllable electromagnets to position said impeller wheel;

a stationary guide sleeve secured within said external casing member, said guide sleeve having at least one inlet and at least one outlet, said at least one inlet being aligned with said at least one radial outlet of said impeller wheel, said at least one guide sleeve outlet being aligned with at least one channel within said external casing member that is in communication with an outlet in said external casing member to provide a fluid path from said at least one radial outlet of said impeller wheel to said external casing member outlet; and at least one aperture extending through said external casing member, said aperture being in communication with a sealed area proximate said upper flat surface of said impeller wheel to provide a path for vapor and excess liquid to exit said pump and return back into the fluid supply.

5. The immersion pump as defined in claim 4 wherein said rotor shaft is supported by a permanent magnet immersion system to provide radial centering of said rotor shaft and includes devices that cooperate with free ends of said rotor shaft to provide passive damping of lateral movements, precession, nutation and rolling movements through the use of eddy currents.

6. The immersion pump as defined in claim 4 wherein said at least one aperture extending through said casing is in communication with sealed areas above and below said upper flat surface and said lower flat surface of said impeller wheel.

7. The immersion pump as defined in claim 4 including a funnel member secured to one side of said motor means and extending outwardly therefrom to a position proximate said upper flat surface of said impeller wheel to inhibit the flow of excess liquid around said motor means.

8. The immersion pump as defined in claim 4 including an internal casing member within said external casing member, said internal casing member encasing the top portion of said rotor shaft, said motor means, said inductive scanning device, said first ring-shaped controllable electromagnet and said top side of said impeller wheel so that fluid initially within said internal casing member may evaporate and be forced out of said internal casing member to enable the pump to operate in a substantially vapor medium.

9. An immersion pump comprising:
an external casing member;
a rotor shaft supported within said external casing member;
motor means for driving said rotor shaft within said external casing member;
an impeller wheel having at least one axial inlet and at least one radial outlet, said impeller wheel being axially mounted to said rotor shaft within said external casing member and being made of a ferromagnetic material;
a funnel member secured to one side of said motor means and extending outwardly therefrom to a position proximate said impeller wheel to inhibit the flow of excess liquid around said motor means;
at least one controllable electromagnet mounted within said external casing member, said controllable electromagnet having a pole surface thereon, said pole surface being positioned for direct electromagnetic contact with said impeller wheel to axially support and position said impeller wheel;
scanning means for monitoring the position of said rotor shaft and for controlling current supplied to said controllable electromagnet to position said impeller wheel; and
a stationary guide sleeve secured within said external casing member, said guide sleeve having at least one inlet and at least one outlet, said at least one inlet being aligned with said at least one radial outlet of said impeller wheel, said at least one guide sleeve outlet being aligned with at least one channel within said external casing member that is in communication with an outlet in said external casing member to provide a fluid path from said at least one radial outlet of said impeller wheel to said external casing member outlet.

10. An immersion pump comprising:
an external casing member;
a rotor shaft supported within said external casing member;
motor means for driving said rotor shaft within said external casing member;
an impeller wheel having at least one axial inlet and at least one radial outlet, said impeller wheel being axially mounted to said rotor shaft within said external casing member and being made of a ferromagnetic material;
at least one controllable electromagnet mounted within said external casing member, said controllable electromagnet having a pole surface thereon, said pole surface being positioned for direct electromagnetic contact with said impeller wheel to axially support and position said impeller wheel;
scanning means for monitoring the position of said rotor shaft and for controlling current supplied to said controllable electromagnet to position said impeller wheel;
an internal casing member within said external casing member, said internal casing member encasing the top portion of said rotor shaft, said motor means, said scanning means, said controllable electromagnet and one side of said impeller wheel so that fluid initially within said internal casing member may evaporate and be forced out of said internal casing member to enable the pump to operate in a substantially vapor medium; and a stationary guide sleeve secured within said external casing member, said guide sleeve having at least one inlet and at least one outlet, said at least one inlet being aligned with said at least one radial outlet of said impeller wheel, said at least one guide sleeve outlet being aligned with at least one channel within said external casing member that is in communication with an outlet in said external casing member to provide a fluid path from said at least one radial outlet of said impeller wheel to said external casing member outlet.

* * * * *